Sept. 9, 1969  G. H. JONES ET AL  3,465,615
PRECISION LOCATING MEANS FOR MACHINE TOOLS
Filed Dec. 29, 1967  2 Sheets-Sheet 2

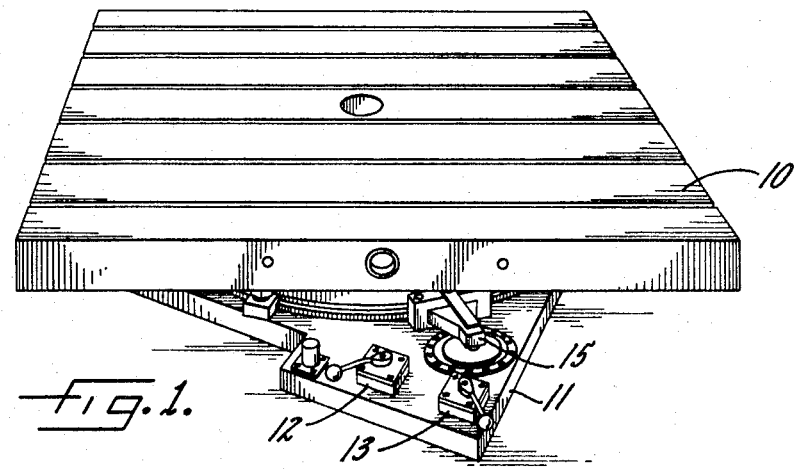
Fig. 1.
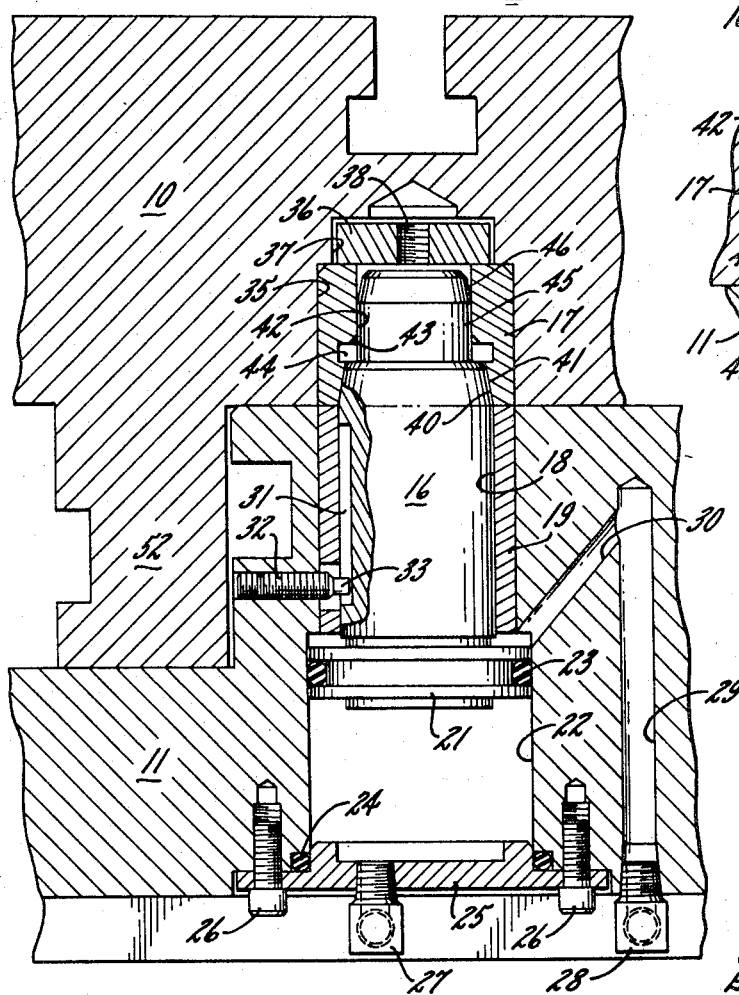
Fig. 2.
Fig. 3.
INVENTORS.
GORDON H. JONES
EVERETT E. HOSEA
BY Wolfe, Hubbard, Voit & Osann
ATTORNEYS.

INVENTORS.
GORDON H. JONES
EVERETT E. HOSEA
BY Wolfe, Hubbard, Voit & Osann
ATTORNEYS.

_United States Patent Office_

3,465,615
Patented Sept. 9, 1969

3,465,615
PRECISION LOCATING MEANS FOR MACHINE TOOLS
Gordon H. Jones, Vandyne, and Everett E. Hosea, Butte des Morts, Wis., assignors to Giddings & Lewis, Inc., Fond du Lac, Wis., a corporation of Wisconsin
Filed Dec. 29, 1967, Ser. No. 694,465
Int. Cl. B23q *17/00*
U.S. Cl. 74—816                      2 Claims

ABSTRACT OF THE DISCLOSURE

A shot pin assembly is described in which a tapered precision shot pin and bushing are provided with a pilot pin and bore, respectively, whereby the full engagement of the elements is blocked until they are sufficiently close to their final engaged positions that impact damage and frictional wear of the precision locating surfaces are avoided.

---

This invention relates to machine tools, and in particular to a shot pin locating means for selectively registering two movable machine elements in a precise predetermined position. In its principal aspect, it concerns a shot pin and bushing locating assembly in which means are provided to assure accurate approximate positioning before the final engagement of the precision locating surfaces of the pin and bushing.

Shot pins are used in many machine tool applications for accurately locating and securing one movable machine element to another. In rotary index tables in particular shot pins have long been used. In brief, this mechanism consists of an axially slidable pin generally carried in the base of the table and engageable with one of a plurality of accurately located bushing bores in the underside of the rotatable table or platen. The engaging surfaces of the pins and bores are commonly tapered for ease of engagement and precise location. The taper allows initiation of engagement when the elements are slightly misaligned, with a resultant self-centering effect. Also, the engagement of a tapered pin with a correspondingly tapered bore tends to eliminate all lateral clearance when full engagement has been achieved.

A disadvantage which has been experienced in the past with tapered pins and bushing bores is that after a long period of use the wear caused by the self-centering effect described above during engagement will damage the precision surfaces of the locating elements and impair the accuracy obtainable. This is particularly true when the shot pin is first urged upwardly and then allowed to "ride" the underside of the platen while the latter is rotated from one position to the next. Upon reaching the next bore, the pin would drop suddenly into position, bringing the platen to a sudden halt. The inertia of a relatively fast-moving platen weighing a thousand pounds or more can easily cause damage to the shot pin and its mating bore as a result of the high engagement forces which are thus created.

The self-centering effect of the tapered pins and bores causes another disadvantage. Where there are high frictional loads attendant in moving the platen relative to the base, such as when a heavy casting is being machined, the high sliding frictional forces on the tapered engaging elements as the pin centers itself in the bushing can result in a considerable amount of wear. This wear eventually affects the accuracy of the locating function of the shot pin. With existing pins and bores of the simple tapered type this difficulty cannot be avoided except by first precisely registering the platen prior to engagement of the shot pin, which is a tedious manual operation and one which the use of such shot pins was originally intended to eliminate.

In view of the foregoing, it is a principal object of the present invention to provide a shot pin locating assembly for machine tools which eliminates impact loading and excessive wear by providing preliminary registration prior to the final engagement of the locating surfaces of the shot pin and bushing. In this connection it is also intended to provide such an assembly in which the locating surfaces cannot be engaged unless the shot pin is in close approximate registration relative to its final position.

Other objects and advantages of the invention will become apparent upon reading the following detailed description and upon reference to the drawings, in which:

FIGURE 1 is a perspective of a rotary table of the type in which the shot pin assembly of the present invention is usefully employed;

FIG. 2 is a fragmentary section of the index table of FIG. 1, illustrating a shot pin assembly embodying the present invention;

FIG. 3 is a fragmentary perspective similar to but rotated 90° from that of FIG. 2, in which the shot pin is shown in partial misalignment with its corresponding bushing;

Figure 4:
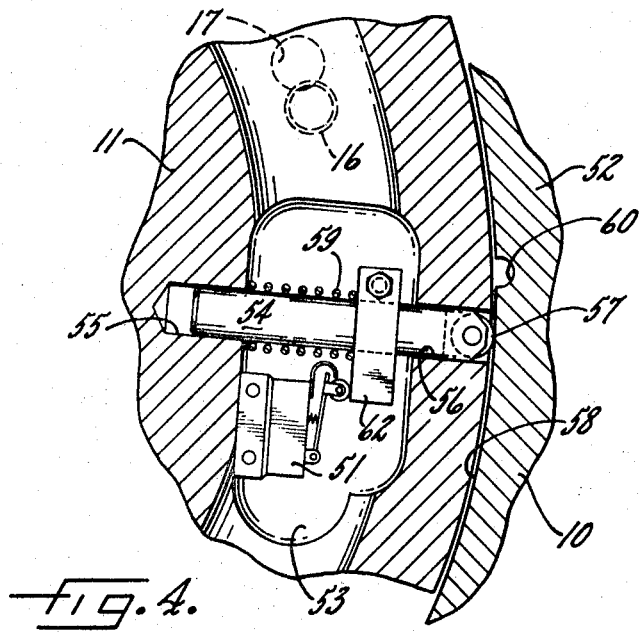
FIG. 4 is a plan view in fragmentary section of the table of FIG. 1, illustrating the cam-operated interlock system for controlling the shot pin assembly.
Figure 5:
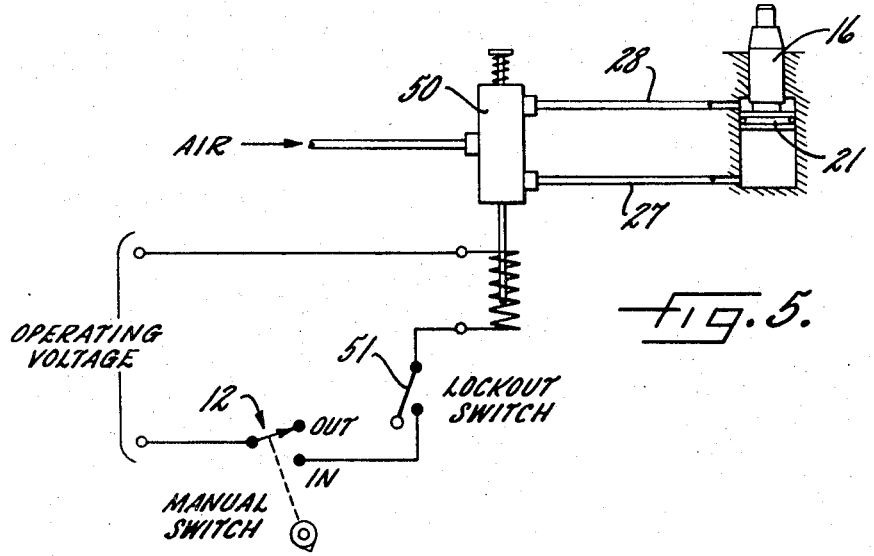
FIG. 5 is a schematic diagram of the control circuit employed with the cam-operated interlock system and shot pin assembly of the preceding figures.

While the invention will be described in connection with a certain exemplary embodiment it will be understood that it is not intended to so limit the invention, but it is instead intended to cover all alternative and equivalent constructions and procedures as may be included within the spirit and scope of the invention as defined by the appended claims.

Turning to the drawings, there is shown in FIG. 1 an illustrative rotary index table embodying the invention and adapted for use with machine tools. This table is externally of conventional design, having a rotatable platen 10, a fixed base 11, and having various external controls by which the table may be manipulated by the operator. In the illustrated embodiment, the controls include manually operated switches which control pneumatic pressure for operation of the shot pins described herein and for clamping of the table. The switch 12 controls the pneumatic system which actuates the shot pin assembly, while the switch 13 controls a pneumatic clamping system which securely clamps the platen 10 to the base 11 during machining operations. Also visible in FIG. 1 is one of the external clamping arms 15 by which the platen 10 is secured to the base 11.

In operation, the platen 10 and the base 11 comprise relatively movable elements which are released for rotation by the operator through the release of the clamping arms 15, and which may be rotated to a desired position for performing a machining operation on a workpiece (not shown) secured to the platen 10. Such machining operations are desirably performed at predetermined rotational positions without the complex task of determining the location each time by means of measuring apparatus. For this reason registration of the platen 10 by shot pin means is utilized, but with conventional shot pin arrangements the difficulties and undesirable features mentioned previously must be tolerated.

A shot pin 16 is carried in the base 11 and is selectively engageable with a corresponding receptacle or bushing 17 in the underside of the platen. The shot pin 16 is pneumatically actuated and is slidable within a precision bore 18 formed within a hardened insert sleeve 19. The insert 19 is itself pressed into one of the movable elements, in this case the base 11. Power for actuation of the shot pin 16 is achieved through a pneumatic piston 21 sliding within a cylinder 22 and sealed by an O-ring 23 located in a suitable circumferential channel surrounding the base of the piston 21. The cylinder 22 is formed within the base 11, and is sealed by an O-ring 24 held by an end plate 25 secured by screws 26 or other suitable fasteners. Pressure fluid is directed into the cylinder 22 through a fitting 27 communicating with the interior of the cylinder. Another fitting 28 is provided which communicates with a bore 29 extending into the base 11, and intersected by another bore 30 communicating with the portion of the cylinder 22 on the opposite side of the piston 21 from the opening of the first fitting 27. In this way fluid pressure may be selectively directed to either side of the piston 21 and the shot pin 16 is thereby raised or lowered as desired. To prevent rotation while permitting axial movement, an axial keyway 31 is formed in the side of the shot pin 16, and a key 32 is threaded through an adjoining bore in the base 11 so that its hardened tip 33 engages the keyway 31.

On the platen 10, the bushing 17 is retained in a precisely positioned bore 35 located on the common planar surface where the two movable elements 10, 11 abut. The bore 35 is located on the platen 10 in a conventional manner such as by means of a precision polygon or other measuring equipment and then cut into its surface. The bushing 17 is then pressed into place. To allow the bushing 17 to be removed later, a puller disk 36 is first inserted into an additional bore 37 provided for this purpose. The puller disk 36 need not fit tightly, as its only function is to provide a means for removing the bushing 17 when desired. The bushing 17 is easily removed by engaging a threaded rod (not shown) with a threaded bore 38 provided in the puller disc 36, and the entire assembly including the bushing 17 can then be withdrawn as a unit.

Both the bushing 17 and the shot pin 16 are formed with precision locating surfaces by which final location of the platen 10 with respect to the base 11 is established when the shot pin 16 is engaged. In the bushing 17 the precision locating surface consists of an axially tapering locating bore 40 having a frustoconical shape. The surface 40 cooperates with a corresponding precision surface 41 on the shot pin 16, also of frustoconical shape.

Pursuant to the invention means is provided by which the shot pin assembly may be partially engaged when the platen 10 and base 11 are in only approximate registration, after which the engagement is completed in a manner which shifts the rotatable elements to their final predetermined positions without causing impact or extreme sliding loads on the precision locating surfaces of the shot pin elements.

Adjacent the locating surface 40 in the bushing 17 there is connected an undercut annular slot 44 which joins the locating bore surface 40 to a pilot bore 42 further within the bushing. The intersection between the pilot bore 42 and the annular slot 44 defines an annular shoulder 43. Because the pilot bore 42 is of smaller diameter than the locating bore 40, the annular shoulder 43 is also of smaller diameter. On the shot pin 16, a pilot segment 45 is provided which mates with the pilot bore 42 of the bushing 17 with a relatively loose, sliding fit. At the tip of the shot pin 16 beyond the locating bore surface 40 and the pilot segment 45 there is provided a further tapered segment 46 which initiates the centering of the pilot segment 45 in the pilot bore 42 during initial engagement.

Pursuant to the invention the length of the pilot segment 45 is made at least as great as the depth of the annular shoulder 43 from the common planar surface between the platen 10 and the base 11. This relationship allows the initial engagement of the shot pin 16 with the receptacle bushing 17 to take place without possibility of damage to the precision locating surfaces 40, 41 of the engageable elements. As seen in FIG. 3, misalignment of the platen 10 with the base 11 causes the bushing 17 to be offset relative to the shot pin 16, and the pilot segment 45 no longer lines up with pilot bore 42. Under these conditions, actuation of the pneumatic power means will raise the shot pin 16 only as far as shown in FIG. 3, whereupon the tip of the locating segment 45 encounters a portion of the annular shoulder 43 and stops. In this position it may be seen that neither of the locating surfaces 40, 41 of the engaging elements are in contact with any part of the assembly, and they are thus protected against damage should the shot pin 16 have been engaged while the platen 10 was misaligned or still moving.

The shot pin 16 is thus prevented from engaging the receptacle bushing 17 until the alignment of the relatively movable elements is improved to the extent that the tapered tip 46 of the locating bore 45 is able to slip into the locating bore 42 and shift the platen 10 a minute distance relative to the base 11 through the wedging action of the tapered tip 46. When the platen 10 is in approximately the correct alignment, the locating segment 45 is enabled to slip within the locating bore 42, thus finally bringing the precision locating surfaces 40, 41 into engagement. At this stage the alignment of the platen 10 is so nearly complete that the minute amount of shifting required to perfect the location through the final engagement of the shot pin 16 is not sufficient to present likelihood of damage to the mating locating surfaces 40, 41.

Further in accordance with the invention, provision is made for an interlock system which prevents the shot pin 16 from being actuated by the pneumatic power means until the platen 10 is in such a position that the locating segment 45 of the shot pin will have no chance of impacting against the locating surface 40 of the bushing 17. It will be appreciated that such a system need be of considerably less precision than a system designed for use with a shot pin assembly not having a pilot segment 45 and pilot bore 42 which assist in achieving proper alignment before engagement of the final locating surfaces. Such a system as the latter would require a system capable of selectively energizing the shot pin 16 only when the platen 10 was within a few thousandths of an inch of the correct position, while in the present invention the allowable range of error is very much greater, being equal to the difference in diameters between the locating bore 40 of the bushing 17 and the pilot segment 45 of the shot pin 16.

The interlock system of the invention includes a solenoid valve 50 which controls the flow of pressure fluid into chambers above and below the piston 21 of the shot pin assembly. By directing pressure fluid into one side or the other, the pin 16 may selectively be raised or lowered as is required. The manual switch 12 controls the solenoid valve 50 for operation of the shot pin assembly. Pursuant to the invention, a lockout switch 51 is also included in a series with the operating switch 12. This is a simple on-off switch which does not complete the control cincuit until one or another of the receptacle bushings 17 is substantially aligned with the shot pin 16 where the operating engagement may be achieved. The switch 51 is preferably of the microswitch type and is carried by the base 11 adjacent an overhanging flange 52 of the rotatable platen 10. As shown in FIG. 4, the lockout switch 51 is mounted in a cut-out opening 53 along with a slidable cam follower 54 retained in bores 55, 56. A roller 57 is pivoted on the cam follower 54. The roller 57 rides against a cam surface 58 formed for this purpose in the flange 52 of the platen 10. The cam follower 54 is biased against the cam surface 58 by a spring 59. In the cam surface 58 there are provided detents 60 into which the cam roller 57 may drop when the rotating platen 10 is in proper relative position with respect to the table 11. Upon engagement of the cam roller 57 with a corresponding detent 60, the cam follower 54 is shifted slightly in the direction of spring bias, and an actuator bar 62 closes the contacts of the lockout switch 51, thus completing the operating circuit of the solenoid valve 50, provided the manual switch 12 has first been closed by the operator.

During operation, the manual switch 12 may be closed while the platen 10 is being indexed from one adjacent work station to the next, or closed just prior to reaching the next work station. In this manner the control circuit for the solenoid valve 50 is kept open until the platen 10 approaches its final position wherein the cam roller 57 will drop into its corresponding detent 60. The lockout switch 51 will then close, activating the solenoid valve 50 and allowing the shot pin 16 to engage the receptacle bushing 17 and securing the platen 10 in its final predetermined locational position. At this point the operator may actuate the clamping control 13, to securely clamp the platen 10 to the table 11 for performing further machining operations.

What is claimed is:

1. In a machine tool having first and second relatively movable elements abutting on common planar surfaces, a precision locating pin assembly comprising, in combination:
    a receptacle in said first element and a movable shot pin in said second element,
    said receptacle having an inwardly tapering locating bore of precisely determined location, a counter sunk pilot bore of smaller diameter than said locating bore, and an annular shoulder at the entrance of said pilot bore,
    said movable shot pin having a tapered locating segment engageable with said locating bore, and terminating in an extending pilot segment engageable with said pilot bore, said pilot segment having a length greater than the depth of said annular shoulder from the planar surface of said first element, and
    means for selectively moving said shot pin into engagement with said receptacle.

2. A rotary machine tool index table comprising, in combination:
    a base element,
    a rotatable platen element carried by said base element,
    a precision locating pin assembly as defined in claim 1 for locating said platen element at a predetermined position relative to said base element,
    a cam race on one of said relatively movable elements having cam actuator means operatively associated with a rotational position corresponding to the approximate alignment of the pilot bore of said receptacle with the pilot segment of said shot pin, and
    control means for selectively actuating said power means to engage said shot pin with said receptacle, said control means including cam-operated interlock means on the other of said elements for allowing the engagement of said shot pin with said receptacle only when said shot pin and receptacle are in such approximate alignment.

References Cited
UNITED STATES PATENTS

| | | |
|---|---|---|
| 2,342,539 | 2/1944 | Gorton. |
| 2,361,091 | 10/1944 | Edelman et al. |
| 2,380,873 | 7/1945 | Schafer et al. _____ 74—817 |

FRED C. MATTERN, Jr., Primary Examiner

F. D. SHOEMAKER, Assistant Examiner